J. BEARD.
TRACTION WHEEL.
APPLICATION FILED APR. 29, 1911.
1,035,112.
Patented Aug. 6, 1912.
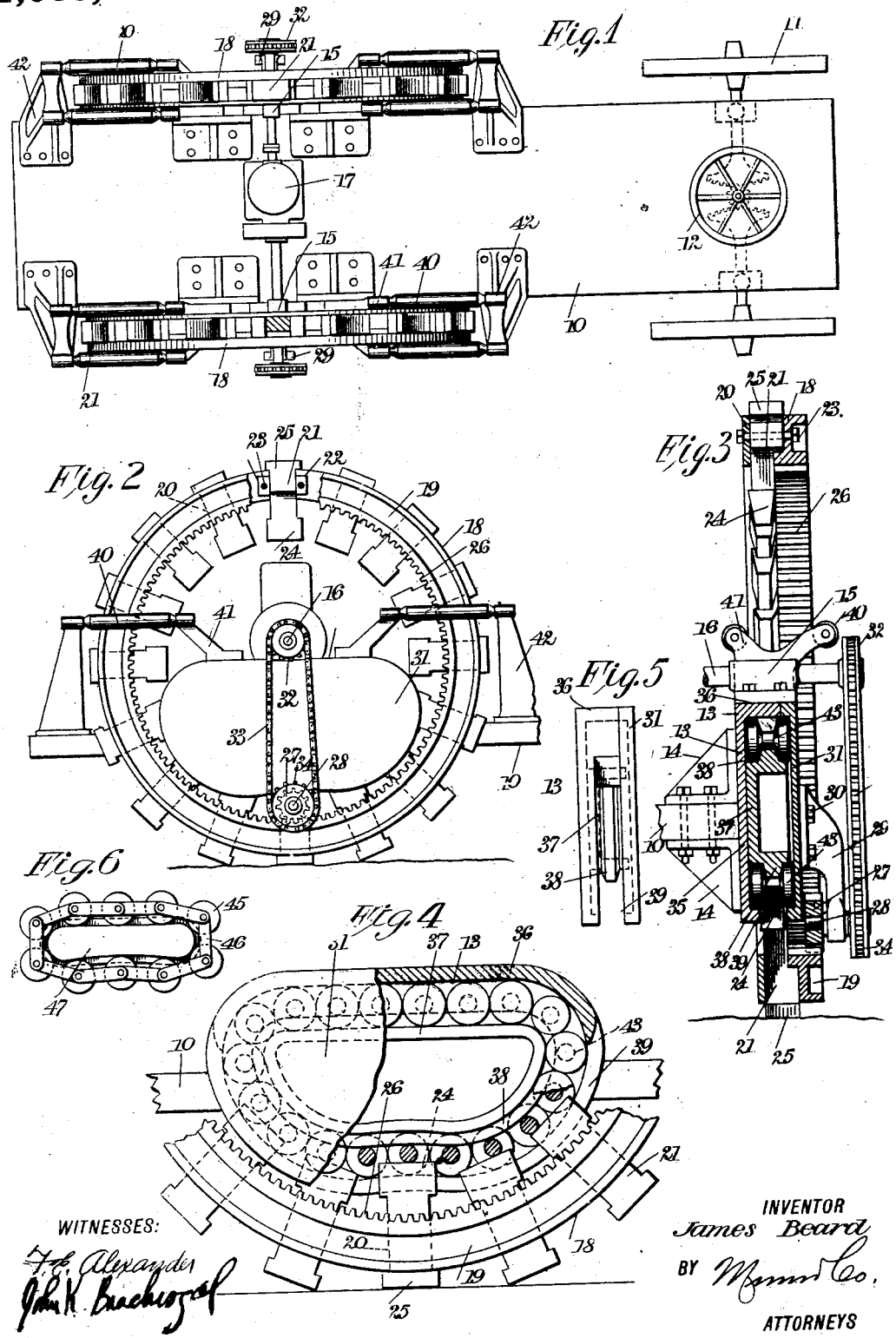
WITNESSES:
INVENTOR
James Beard
BY Munn & Co.
ATTORNEYS

UNITED STATES PATENT OFFICE.

JAMES BEARD, OF VETERANS HOME, CALIFORNIA.

TRACTION-WHEEL.

1,035,112.  Specification of Letters Patent.  Patented Aug. 6, 1912.

Application filed April 29, 1911. Serial No. 624,010.

*To all whom it may concern:*

Be it known that I, JAMES BEARD, a citizen of the United States, and a resident of Veterans Home, in the county of Napa and State of California, have invented a new and Improved Traction-Wheel, of which the following is a full, clear, and exact description.

This invention relates to traction wheels for use with road locomotives, traction engines, agricultural implements and other vehicular structures, and has reference more particularly to a wheel of the class described, which comprises a revoluble rim having radially movable feet, a series of freely movable guide rollers adapted to be engaged by the feet, and arranged to permit a plurality of the feet to come into contact simultaneously with the ground.

The object of the invention is to provide a simple, strong and durable traction wheel which can be used with motor-driven vehicles or vehicles adapted to be propelled by draft animals, by means of which tractive force can be applied evenly, which permits of the obtaining of a fair rate of speed, which is especially useful in heavy going, such as muddy, sandy, or badly constructed or rutted roads, and in which the guide rollers for the movable feet assist in steadying the wheel, and aid in avoiding undue torsional stresses of the vehicle structure.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a plan view of a motor-driven vehicle having wheels associated therewith, which constitute embodiments of my invention; Fig. 2 is a side elevation of a wheel constructed in accordance with my invention, part being broken away; Fig. 3 is a vertical section of the wheel; Fig. 4 is an enlarged, fragmentary, side elevation, showing part of the wheel and the guiding devices, partly in section; Fig. 5 is a side elevation of the casing for the guide rollers; and Fig. 6 is a side elevation showing part of a guide casing and rollers of modified form.

Before proceeding to a more detailed explanation of my invention, it should be clearly understood that while the traction wheel is particularly useful with motor-driven vehicles, it can also be employed with wagons or other vehicles adapted to be drawn by animals.

While I have shown in the accompanying drawings a motor-driven vehicle having two traction wheels it may be found sufficient to employ a single, centrally disposed wheel of large dimension. The wheel or wheels can be attached to the vehicle frame in any suitable manner, and this and others of the details of construction, shown for example herewith, form no part of the invention, and can be varied in accordance with individual preference and special conditions, without deviating from the essence of the invention as defined in the appended claims.

Referring more particularly to the drawings, I have illustrated a motor-driven vehicle, herewith, having a body or frame 10, and at the front end thereof, steering road wheels 11 controlled by suitable steering mechanism 12. At the rear, the vehicle body at each side, has a guide roller casing 13, the form and construction of which will be described in greater detail hereinafter. The casings are secured to the body by means of angle brackets 14, bolted in position. Upon each casing is bolted or otherwise secured a bearing 15, these are alined transversely of the length of the vehicle. The rear or driving axle 16 is journaled in these bearings and has the ends projecting laterally beyond the same. A prime mover 17 of any suitable form is employed for actuating the driving axle and it may consist for example, of an internal combustion engine. It will be understood that it is desirable, from a practical standpoint, to construct the axle in two sections, and to associate therewith differential gearing, or other necessary mechanical elements. These details are however, not shown in the present embodiment of the invention, as they form no part of the latter.

The two traction wheels are similar and each comprises a rim 18 of annular form, and having in the outer face a groove or channel 19, extending around the same, for the purpose of decreasing the weight of the rim, though giving it sufficient width. The rim is provided with a plurality of radial openings 20 in which are slidably mounted corresponding, radially movable feet 21.

Located in each opening are stops 22 secured in place by means of bolts 23 and adapted to be engaged by the laterally extended inner ends 24 and the laterally extended outer ends 25 of the feet, so that the movements of the same are limited. The feet are disposed near the inner edges of the wheel rims, and the latter are provided at the inside near the outer edges, with suitable gear teeth 26. Pinions 27 mounted upon stub shafts 28 mesh with the gear teeth 26. The stub shafts are journaled in bearing brackets 29, secured in place by means of bolts 30 on the cover plates 31 of the guide roller casings. At each end the axle or shaft 16 has a sprocket 32 operatively connected by means of a chain 33, with a sprocket 34 secured rigidly upon the corresponding end of one of the stub shafts 28. It will be understood that if so desired the chains and sprockets can be replaced by directly meshing gear wheels.

The guide roller casings are of substantially semicircular, rounded form, and each has a back 35 and radially disposed edge flanges 36 against which seats the front or cover 31. Within each casing is located a central guide member 37 of hollow form, for the sake of lightness, and having at the outer edge a wedge-shaped, laterally extended rib 38. The guide rollers 43 are reduced intermediate their ends, so that they have substantially the form of dumb-bells, the annular groove or recess being of wedge or tapered cross-section, and conforming to the cross-section of the rib 38. The inner ends 24 of the feet are also of correspondingly tapered, wedge shape, and thus can engage the reduced part of the guide rollers, as is clearly shown in Fig. 3. The guide rollers travel about the member 37 in the space between the latter and the flange 36 of the casing, bearing against the guide member 37 when in the lower portion of the casing. This lower portion is inwardly disposed, or rather, upwardly reëntrant, as is shown most clearly in Fig. 4. The flange 36, at the lower half of the casing has a cut away part or slot 39 through which the inner ends of the feet can come into engagement with the guide rollers as the rim revolves and brings the feet successively into operative relation with the guide means. The reëntrant form of the guide casing is such that three of the feet are simultaneously in contact with the ground, thereby insuring most efficient tractive action and bearing of the wheel. Of the three feet in contact with the ground at one time, the middle one engages at substantially right angles thereto, the end ones being angularly disposed and engaging the ground with the opposite edges, whereby an effective gripping of the ground is produced.

I have illustrated in the present form of the device guide rollers 40 of elongated form and positioned at the inner and outer edges of the rims and in engagement therewith, the rollers being journaled in suitable bearings 41 and bearing brackets 42 carried by the vehicle body. However, I find that I can do away with these rollers if so desired, provided the guide casings are of sufficient length to permit a plurality of the feet to be engaged therewith simultaneously. In the present form of the invention it will be seen that as many as seven of the feet are in operative relation to the guide casing of each wheel, and the latter is thus steadied against lateral movements which would injure it or the adjacent and connected parts of the vehicle body, the driving mechanism, etc.

It will be understood that the revoluble rims of the traction wheels are actuated from the shaft or axle 16, with the connecting gear. In the wheels used in connection with horse-drawn vehicles or the like, the prime mover, the axle and the gearing are of course eliminated. The rollers in my wheel are freely movable and thus act as do the balls or rollers in a bearing of that kind. It will be understood that owing to this fact the friction between the feet and the guide rollers is minimized. As the feet guidingly engage the rollers the latter travel along in the guide casing and the weight of the vehicle upon the feet is thus suitably supported upon the roller bearing.

I have found that it may be advisable to arrange the guide rollers so that they travel out of contact with each other. As shown in the modified form, I may employ a series of rollers 45 spaced apart, and connected by means of pivoted links 46. The rollers are arranged to travel about a guide part 47 of a roller casing which corresponds to the element 37, the rollers 45 themselves corresponding in form to the rollers 43 of the preferred form.

Having thus described my invention, I claim as new and desire to secure by Letters Patent:

1. A wheel of the class described, comprising a revoluble rim having a plurality of radially movable, projecting feet, a fixed guide casing, a series of independent and freely movable guide rollers therein, and providing an internal continuous path for said guide rollers, said casing being cut away to permit said feet to come into engagement with said guide rollers, said path of said casing at the lower portion being reëntrant.

2. A wheel of the class described, comprising a revoluble rim having radial openings, feet mounted in said openings, stops for limiting the radial movement of said feet, a fixed guide casing having therein a continuous path, a series of guide rollers freely movable in said path, said path at the lower portion being reëntrant, each of said guide rollers having an annular groove intermediate its ends, of wedge cross section, each of said feet having the inner end of wedge cross section, said casing being cut away to permit said inner ends of said feet to come into engagement with said guide rollers, as said rim revolves.

3. A wheel of the class described, having a revoluble rim having radially movable feet, a fixed, elongated guide casing arranged within said rim, a series of freely movable guide rollers therein, said casing having at the lower portion a slot whereby a plurality of said feet is simultaneously in contact with said rollers, and whereby the guide means serve to steady the rim in its movement.

In testimony whereof I have signed my name to this specification in the presence of two subscribing witnesses.

JAMES BEARD.

Witnesses:
ROBERT S. GOUDY,
ROBERT CRAIG.

Copies of this patent may be obtained for five cents each, by addressing the "Commissioner of Patents, Washington, D. C."